VARIATION OF POTENTIAL ALONG COMMUTATOR WINDING FOR
VARIOUS VALUES OF K.

1. DOTTED LINES IN CIRCLES INDICATE WHICH ARMS ARE NOT CONNECTED TO SERVO AMPLIFIER.
2. VOLTAGE VALUES SHOWN ARE RELATIVE.

INVENTOR.
EDWARD H. WILDE

United States Patent Office 2,915,688
Patented Dec. 1, 1959

2,915,688

DIGITAL TO ANALOG SERVOSYSTEM

Edward H. Wilde, Wiesbaden, Germany, assignor to the United States of America as represented by the Secretary of the Air Force Application November 8, 1956, Serial No. 621,113

3 Claims. (Cl. 318—28)

(Granted under Title 35, U.S. Code (1952), sec. 266)

The invention described herein may be manufactured and used by or for the United States Government for governmental purposes without payment to me of any royalty thereon.

The subject invention relates to a binary digital to shaft transducer of the type shown and described in my co-pending application No. 585,494, filed May 17, 1956, now Patent No 2,814,006. In such a transducer, as explained in said co-pending application, a binary digital representation of a given number is converted into a voltage proportional to the number, and said voltage, in turn, is used to fix an angular shaft position, measured in degrees, which bears a direct linear relationship to said given number.

The particular improvements constituting the present invention comprise the substitution of a simple and more directly responsive mechanism for converting received voltage impulses, representative of a numerical input, into the desired degree of shaft rotation. More specifically, the invention substitutes a four-armed rotary contact assembly and novel switching means associated therewith, in lieu of the more complex commutating mechanism of my patent referred to.

In furtherance of the above-indicated purposes of the present invention, a feature of the present invention, which is an improvement over the invention of my patent referred to, is a unique switching means cooperating with a quadruple-armed commutator whereby the shaft of said commutator may be revolved a complete revolution without resorting to phase reversal of the applied voltages.

An additional feature of the present invention, which is an improvement over the invention of my patent referred to, is that whereas the said prior invention required precise linearity in all four quadrants of the commutator, the present invention requires such high precision in only one quadrant. For the other three quadrants, normal commercial accuracy will suffice.

Still another feature of the present invention is a unique relay means wherein each of four contact arms of the commutator may be selectively connected to a servo amplifier, which, in turn, controls the operation of a servo drive motor and a common shaft between the servo drive motor and the apex of the commutator arms, and whereby said arms are rotated until a null position is reached after the reception of each digital representation.

An added feature of the present invention, which is an improvement over the embodiment of my patent referred to, is that the taps on the commutator of only one quadrant need be located exactly 90° apart.

Other features and objects of the invention will be apparent from a detailed description of the invention and from the appended drawings and claims.

Figure 1:
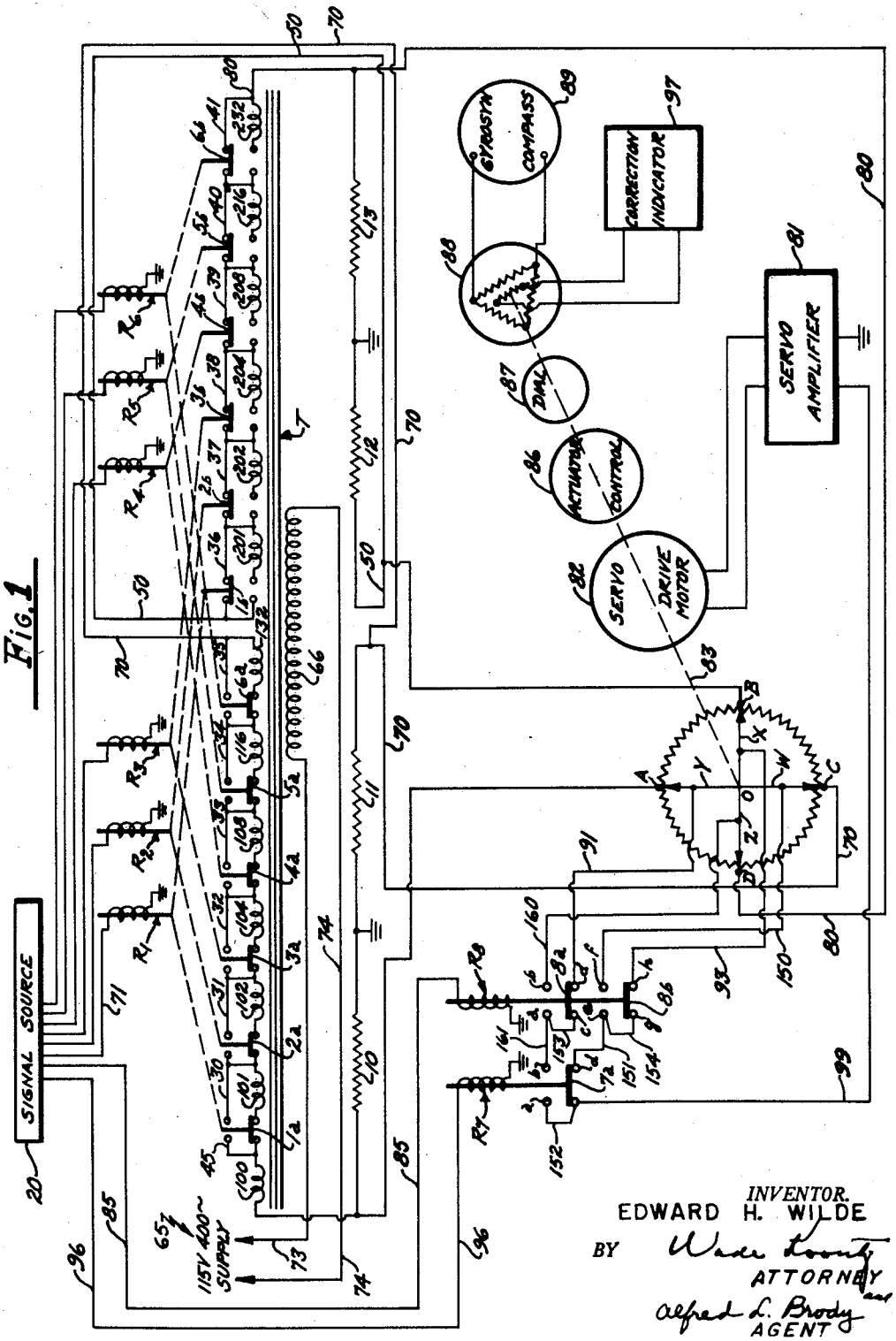
Fig. 1 is a schematic diagram of the complete circuit of the invention.

The device comprises a continuous linearly wound commutator with four taps, spaced 90° apart, for applying complementing voltages across each opposite pair of taps and four contact arms, alternately in circuit, spaced 90° apart, and insulated from one another. Selective operation of a plurality of relays, insert in circuit selective secondary windings of a transformer, wherein each of said windings induces a voltage different from one another and of predetermined value representative of a binary series, and wherein the additive voltage of the secondary windings, in circuit, is applied to the taps on the commutator. The position of the contact arm, in circuit, gives angular reading representative of a given number.

The relays are actuated by voltage signals received from a counting circuit, not a part of the present invention, which in turn is actuated by coded pulse signals. Said coded pulse signals may be transmitted, for example, from a transmitter located on the ground to an aircraft in flight, which is provided with a transducer as described herein, or said transducer may be used for the operation of any one of a number of remote control devices, including such a transducer.

In the present device a pulse may be accurately converted, by means of different voltages obtained from a plurality of differently wound transformer secondary windings, from a binary digital representation to a linearly proportional angular position of the rotor of servo drive motor.

The commutator is at least partially linearly wound and has four taps spaced 90° apart and four arms spaced 90° apart and insulated from one another, whereby each alternately spaced pair of taps is connected to a bank of differently wound transformer secondary windings of predetermined output voltages.

The invention as disclosed in the drawings and description, requires a signal source 20 which converts a series of pulses representing a number into a binary representation of said number. Such devices are well known in the art and the specific details thereof form no part of the present invention. The binary representation appears in the form of voltage signals applied to such of the relays $R_1$ through $R_8$, as have corresponding binary designations. The pulses are initially received by said signal source from some form of transmitter (not shown).

Figure 4:
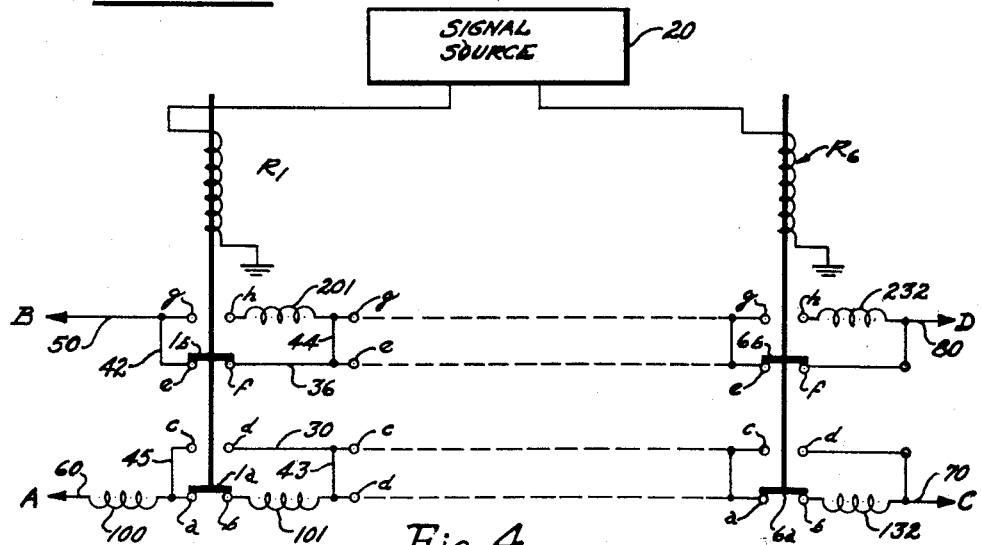
Fig. 4 is an electrical equivalent circuit of relays $R_1$ through $R_6$, and the secondary transformer windings of the circuit as shown in Fig. 1.

Each of relays $R_1$, $R_2$, $R_3$, $R_4$, $R_5$, and $R_6$ are DPDT relays and may alternately connect in circuit either one of two secondary windings of a transformer T. For example, when the coil of relay $R_1$ is not energized (see Figs. 1 and 4), bridge element $1a$ of relay $R_1$ will engage its contact points $a$ and $b$ to insert secondary winding 101 in the circuit and open the circuit across contacts $c$ and $d$ of relay $R_1$. However, simultaneously the bridge element $1b$ of relay $R_1$ will engage its contact points $e$ and $f$ to complete a connection from line 50, through by-pass line 42 across bridge element $1b$, through secondary by-pass line 36 to either by-pass line 44 and point $g$, or to point $e$ of the next relay $R_2$, depending upon the position of bridge element $2b$. In the latter case, the points $g$ and $h$ of relay $R_1$ between main line 50 and secondary winding 201, are not connected by bridge element $1b$.

If, however, the coil of relay $R_1$ is energized, the bridge elements $1a$ and $1b$ will be raised so that secondary winding 101 would be by-passed through said points $c$ and $d$ and line 30 to either line 43 and either point $a$ or $c$ of the next relay $R_2$, depending upon the position of bridge elements $2a$ and $2b$ of said relay $R_2$. At the same instant, element $1b$ engages points $g$ and $h$, and secondary winding 201 would then be in circuit.

In view of the foregoing, it follows that the bistable positions afforded by de-energizing or energizing relay $R_1$ will insert either secondary winding 101 or 201 in circuit. Relays $R_2$, $R_3$, $R_4$, $R_5$ and $R_6$ are each similarly bistably connected and disconnected to its respective pair of secondary windings 102 and 202, 104 and 204, 108 and 208, 116 and 216, and 132 and 232.

Windings 100, 101, 102, 104, 108, 116 and 132 may be connected in series when each of relays $R_1$, $R_2$, $R_3$, $R_4$, $R_5$ and $R_6$ is de-energized so that bridge elements $1a$, $2a$, $3a$, $4a$, $5a$ and $6a$, each complete a circuit between adjacent windings on either side of each of said elements. If relays $R_1$ to $R_6$ are all energized, then the circuit would run from main line 60 through winding 100, through by-pass line 45, bridge element $1a$, by-pass line 30, bridge element $2a$, line 31, bridge element $3a$, line 32, bridge element $4a$, line 33, bridge element $5a$, line 34, bridge element $6a$, line 35 to main line 70 (see Fig. 1). Of course, any combination of relays $R_1$ to $R_6$ may be de-energized or energized so that various combination of windings 101, 102, 104, 108, 116 and 132 may be in circuit or by-passed.

Conversely, windings 201, 202, 204, 208, 216 and 232 may be connected in series when each of relays $R_1$ to $R_6$ are energized so that bridge elements $1b$, $2b$, $3b$, $4b$, $5b$, and $6b$ each complete a circuit between adjacent windings on either side of each of said elements. If relays $R_1$ to $R_6$ are all de-energized then a circuit would be completed through main line 50, by-pass 42, bridge element $1b$, line 36, bridge element $2b$, line 37, bridge element $3b$, line 38, bridge element $4b$, line 39, bridge element $5b$, line 40, bridge element $6b$, line 41 and main line 80. In addition, any combination of relays $R_1$ to $R_6$ may be energized or de-energized so that various combinations of windings 201, 202, 204, 208, 216 and 232 may be placed in circuit or be by-passed.

The aforementioned secondary windings are differently wound so as to selectively provide output voltages of magnitudes proportional to a binary digital representation. That is, windings 100, 101, and 201 are each wound to provide an output voltage of magnitude 1E, windings 102 and 202 are each wound to provide a voltage of magnitude 2E, windings 104 and 204 are each wound to provide a voltage of magnitude 4E, windings 108 and 208 are each wound to provide a voltage of magnitude 8E, windings 116 and 216 are each wound to provide a voltage of magnitude 16E, and windings 132 and 232 are each wound to provide a voltage of magnitude 32E.

It is well known that numbers may be expressed by binary digital representations or codes, so that any desired number may be built up as a sum of powers of the number 2. Thus, for example, the number 25 may be expressed as $1 \times 2^4 + 1 \times 2^3 + 0 \times 2^2 + 0 \times 2^1 + 1 \times 2^0$. The 0's and 1's preceding each of the aforestated algebraic expressions designate, respectively, the secondary windings which are "out" or "in" circuit.

In the present invention relay $R_1$ corresponds to the binary number $2^0(1)$, $R_2$ to $2^1(2)$, $R_3$ to $2^2(4)$, $R_4$ to $2^3(8)$, $R_5$ to $2^4(16)$, and $R_6$ to $2^5(32)$. It follows then that the bistable positions inherent to relays $R_1$ through $R_6$, may insert in one circuit an additive voltage of any desired magnitude ranging in integral steps from $0 \times E$ to $63 \times E$, and at the same time said relays may decrease the voltage in the other circuit by the same amount. The secondary 100, which has a voltage of magnitude $1 \times E$, is always in circuit regardless of the positions of any of the relays.

Figure 3:
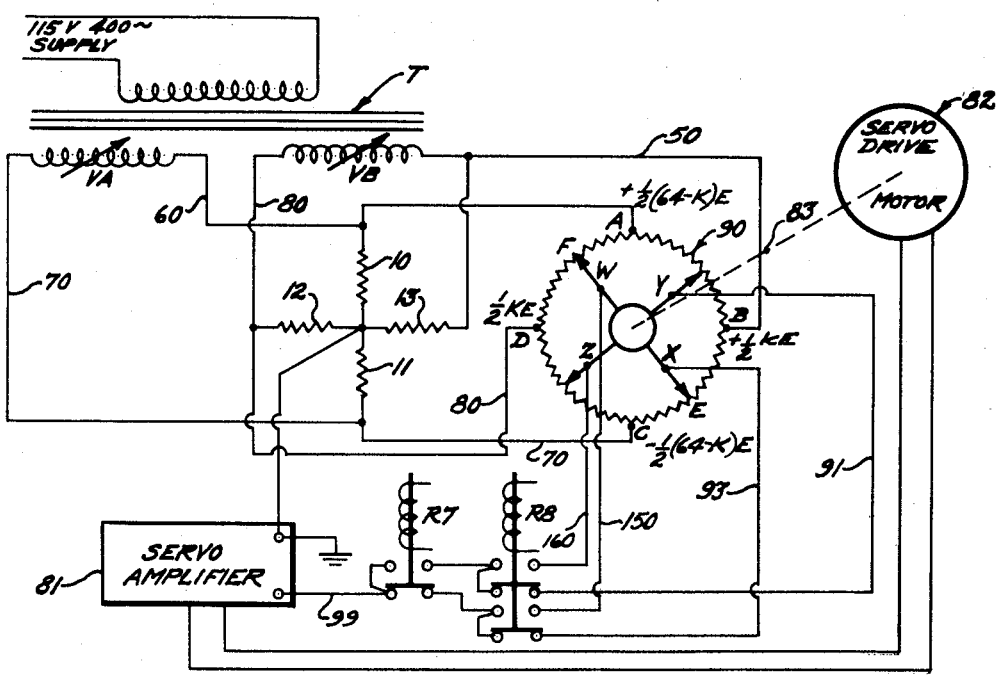
Fig. 3 is an electrical equivalent circuit of the commutator and servo drive portion of the circuit, as shown in Fig. 1.

Windings 100, 101, 102, 104, 108, 116 and 132, any number of which may be in series to one another through relays $R_1$ through $R_6$, and which may be collectively designated as variable voltage VA (see Fig. 3), are connected to commutator 90 at tap A through line 60 at one end and at tap C through line 70 at the other end, spaced 180° from tap A along the periphery of the commutator 90 (see Figs. 1 and 3). This voltage varies from $64 \times E$ to $1 \times E$. It is also connected to ground through resistors 10 and 11.

Windings 201, 202, 204, 208, 216 and 232, any number of which may be connected in series and which are collectively designated as variable voltage VB (see Fig. 3), are connected to commutator 90 at tap B through line 50 at one end, spaced 90° clockwise from tap A, and connected at tap D through line 80 at the other end and spaced 90° clockwise from tap C. This voltage varies from 0 to $63 \times E$. It is also connected to ground through resistors 12 and 13.

It is obvious that due to the mutually reciprocal action of relays $R_1$ to $R_6$, variable voltages VA and VB will always share a constant total voltage or, in other words, said voltage VA and VB will always "cross-complement" one another.

The commutator 90 comprises a potentiometer having four arms X, Y, W and Z, (instead of the conventional single arm potentiometer), pivoted at its pivot member O, fixed 90° apart and insulated from one another. The outer ends of said arms X, Y, W and Z are free to move as a unit and make contact along the windings of said potentiometer; however, in all positions of said arms they are fixed to remain spaced 90° apart from one another. Arm Y is connected through wire 91 to lower contact point $d$ of bridge element $8a$ of a relay $R_8$, arm X is connected through wire 93 to lower contact point $h$ of bridge element $8b$, arm W is connected through wire 150 to upper contact point $f$ of bridge element $8b$, and arm Z is connected through line 160 to the upper contact point $b$ of bridge element $8a$.

Relay $R_7$ has its upper contact point $b$ connected to upper contact point $a$ of relay $R_8$ by wire 161 and lower contact point $d$ of relay $R_7$ is connected by wire 151 to contact point $e$ of relay $R_8$. Jump wires 152, 153 and 154 connect respectively contacts $a$ and $c$ of relay $R_7$, contacts $a$ and $c$ of relay $R_8$ and contacts $e$ and $g$ of relay $R_8$. The lower left-hand contact point of relay $R_7$ is connected to the high side of servo amplifier 81 through wire 99. Said servo amplifier 81 applies a voltage to turn the rotor of servo drive motor 82 through an angle linearly proportional to the applied voltage. The rotor of said servo drive motor 82 is mountedly fixed to a common shaft with the apex of arms X, Y, W and Z. Rotation of the rotor of servo drive motor 82 will therefore cause the arms X, Y, W and Z to turn through the same angle as said rotor.

Relay $R_7$, which is in the form of a SPDT switch, is energized by a pulse from a signal source 20 through line 96 and relay $R_8$, which is in the form of a DPDT switch, is energized through a pulse from line 85.

When it is desired to register a number having a numerical value between 0 and 63, relays $R_1$ to $R_6$ operate to set up a voltage pattern on the commutator such that a point of zero potential E appears between B and D; while another appears at F between D and A. The servo mechanism causes the arm to which it is connected to select point E. The distance from B to E measured in degrees will be the same proportion of 360° as the number is of 256. For numbers 63 and less neither of relays $R_7$ or $R_8$ would be operated. The servo amplifier would be connected to arm X, which would move to E. If the number is between 64 and 127 inclusive, the point of zero potential will still be between B and C. However, the binary number $2^6(64)$ would be included in the number. Relay $R_7$ would operate, but not relay $R_8$. The servo amplifier would be connected to arm Y which would move to E and cause arm X to move to a point 90° advanced from E. Numbers between 128 and 191 inclusive include the binary digit $2^7$ but not $2^6$. Relay $R_8$ would be operated and relay $R_7$ not operated. The servo amplifier would be connected to arm W which would move to E and thus cause arm X to move to a point 180° advanced from E. Finaly for numbers between 192 and 255 both relays $R_7$ and $R_8$ would be operated, connecting the servo amplifier to arm Z, which would move to E and cause arm X to move to a point 270° advanced from E (or 90° back from E).

Thus for numbers in any or all of the four categories (namely, 0 to 63; 64 to 127; 128 to 191; and 192 to 255) the four arms rotate in a single continuous direction, without reversal of the direction of energization of driving motor 82. In my prior system, as disclosed in my application No. 585,594 (now Patent No. 2,814,006) such reversal would be necessary in at least two of the situations above hypothesized.

Figure 2:
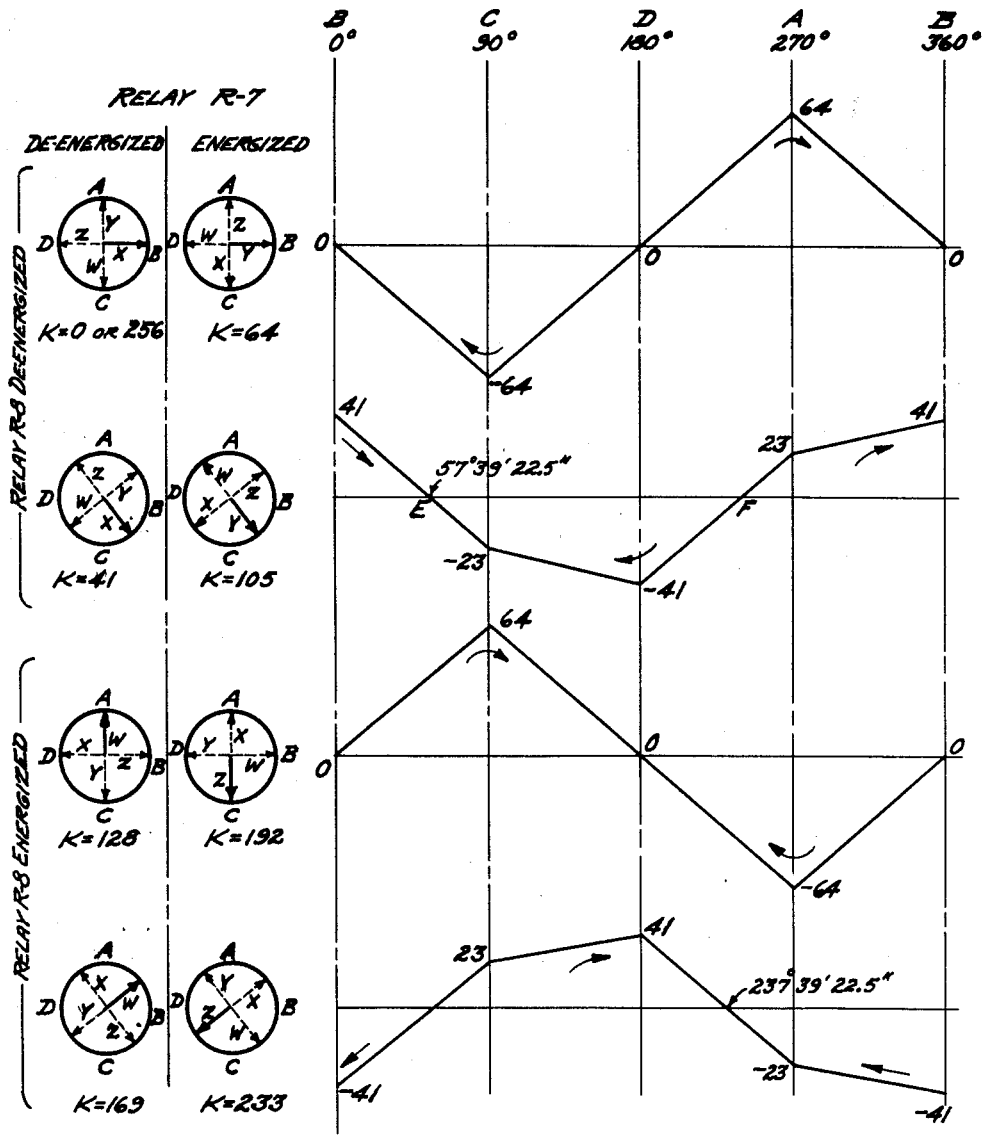
Fig. 2 is a graphic representation of the variations of voltages for the four commutator taps corresponding to different numbers from 0 through 256, and showing the positions of the arms taken as a result of the voltage pattern.

The voltage patterns and resultant positions taken by arms X, Y, W and Z are shown graphically in Fig. 2, for several values of K. It is noted that each circle at the left represents the commutator 90 for different values of K, wherein the arm X, Y, W or Z in solid line indicates the arm momentarily connected to the servo amplifier 81 and the arms in dotted lines indicates the arm momentarily not connected to said amplifier 81. In addition, the arrows shown in the voltage patterns indicate the direction in which the particular arm connected to the servo amplifier 81 will be moved by the servo drive motor 82 when said arm is removed from the point of zero potential.

The power supply 65, which is applied to the primary 66 of transformer T, is 115 volts A.C., at 400 cycles, while the relays are actuated by 24 volts D.C. The resistance across each pair of taps A and C, and taps B and D is approximately 2500 ohms, while the actual voltage of magnitude 32E (induced in either secondary windings 132 or 232) is approximately 26 volts. All the aforementioned values of the circuit components are not critical and may be varied to suit the requirements of a particular device or system.

Any of a number of conventional "flip-flop" or "trigger" circuits (not shown) may be substituted for relays $R_1$ to $R_8$ to considerably shorten the time constant of the present device.

The rotor of servo drive motor 82 is commonly connected through shaft 83 to an actuator control 86. Said actuator control 86 will thereupon turn, for example, an aircraft rudder so as to cause the aircraft to turn until its heading corresponds to the position indicated by the transmitted pulse signal.

The counting circuit must be so designed that it maintains the voltages set up for one pulse signal until a new signal is received. It should then set up new voltage signals to correspond to the new pulse signal.

The present device was designed to work in conjunction with a "Zero Reader." The binary number furnished to said device corresponds to a desired heading for an aircraft. In this arrangement, the rotor of a synchro motor 88 and a dial 87 calibrated in degrees from 0° to 360° are also fixed to and rotate with shaft 83. The stator of said synchro motor is connected to a gyrosyn compass 89. The dial 87, therefore, indicates the desired heading and the rotor of synchro motor 88 transmit a signal corresponding to the difference between the desired heading and the actual heading to a correction indicator 97.

The device can be extended to any number of digits by inserting additional DPDT relays in the chain connected to the transformer T and adding secondaries to said transformer with proper voltage values. Obviously, one relay and two secondaries would be required for each additional binary digital representation.

For instance, the maximum number could be extended to 512 by adding another DPDT relay selectively connecting either of one of two additional secondary windings in circuit. Each of said windings should be wound so as to produce a voltage of 64E and be connected in series, one to the chain of variable voltage VA and the other to the chain of VB. The new relay would correspond to the binary digit $2^6$, while the present relays $R_7$ and $R_8$ would correspond to $2^7$ and $2^8$, respectively. The circle would be divided into 512 parts, each step corresponding to 42' 11.25" and the maximum inherent error would be reduced to about 21' 6".

The device is linear with respect to the number furnished to it, so that the angular position of the servo drive motor 82 will be directly proportional to the magnitude of the digital count applied to the system by means of the pulse signals. Its accuracy is dependent upon the care in which the parts are made, the accuracy of the ratio of turns of the transformer secondaries, the accuracy of equality of the resistor pairs 10, 11 and 12, 13, and the sensitivity of the servo system. The actual value of the voltage input is not important; however, the relative values of voltages induced in the transformer secondaries are critical. The range of values chosen will be dependent upon the requirements of the servo amplifier 81. The points A, B, C, and D of the commutator 90 must be accurately spaced 90° apart and the resistance between adjacent pairs of taps must be equal. However, high precision is required only for 90° spacing of two taps and the linearity of the winding for the remainder of the commutator may be of normal commercial accuracy.

Although this invention has been disclosed and illustrated with references to particular application, the principles involved are adaptable to numerous other applications which will appear apparent to persons skilled in the art. The invention, is, therefore, to be limited only as indicated by the scope of the appended claims.

I claim:

1. An apparatus for decoding electrical pulses comprising a pulse input means; voltage-regulating means operated by the pulses from said pulse input means; said voltage-regulating means including a pair of progressively varying voltage components of constant combined magnitude and constant phase sign; voltage dividing means including a resistor network, four commutator arms and switching means for causing said progressively varying voltage components to be shunted from one of said arms to another as all four arms rotate in unison in a single direction of rotation in response to operation of said voltage-regulating means, and servo loop means responsive to the operation of said four commutator arms for controlling the duration of the cycle of operation of said voltage-dividing means.

2. An apparatus as defined in claim 1, wherein the switching means comprises a double-pole double-throw switch member connected to each of the four commutator arms; and a single-pole double-throw switch member connected in series with the servo loop means, said double-pole double-throw switch member and two of the commutator arms; whereby the selective effectiveness of said commutator arms as they rotate in unison in a single direction of rotation is determined by the position of both of said switch members.

3. Apparatus for transducing electrical pulse signals from a digital count to an angular shaft position comprising means for cross-complementing a pair of determining components in accordance with said signals, means for applying the output voltage of said components to opposite alternately spaced points of a resistor-commutator network to cause unbalance of said resistor-commutator in a uni-directional pattern in which the phase of the voltage components remain constant and to an extent proportional to the received digital count, means for actuating a servo loop including the rotation of said shaft in accordance with the output voltage of one portion of said resistor-commutator network for an angular movement of less than 90° and means for switching the control to any one of a plurality of other portions of said resistor-commutator network for an angular movement in excess of 90°, all the said angular movements being in the same direction of rotation for all output voltage values.

References Cited in the file of this patent
UNITED STATES PATENTS 2,814,006    Wilde _____ Nov. 19, 1957